Oct. 2, 1956     M. A. MÜLLER     2,765,163
RESILIENT DEVICE
Filed June 5, 1951     2 Sheets—Sheet 1
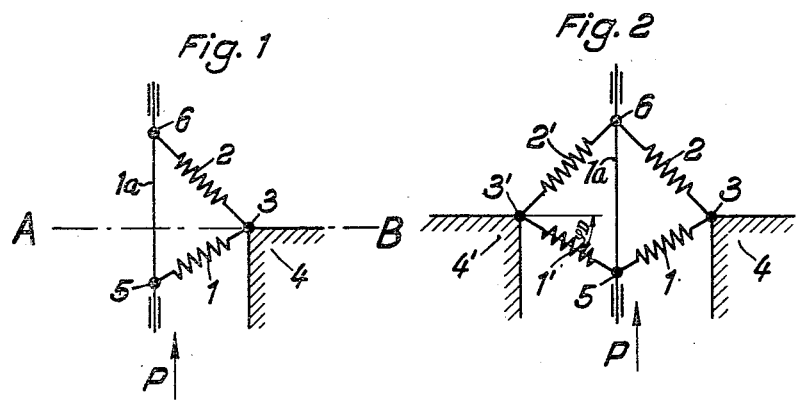
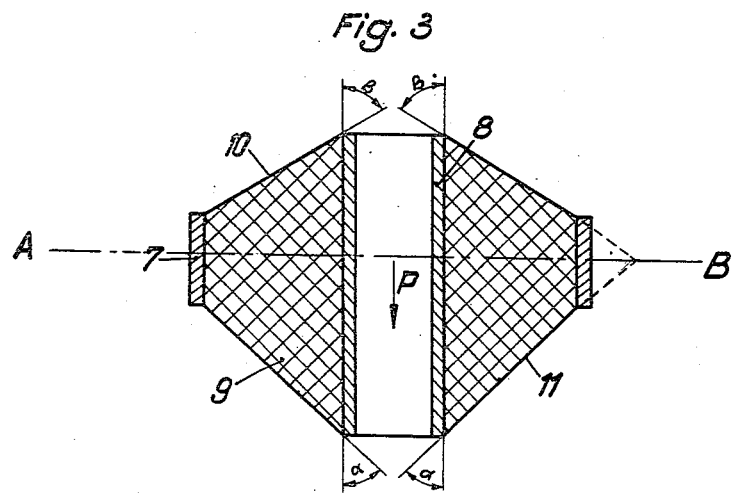
Inventor:
MAX ADOLF MÜLLER
By *Freeman*
ATTORNEY Oct. 2, 1956   M. A. MÜLLER   2,765,163
RESILIENT DEVICE Filed June 5, 1951   2 Sheets-Sheet 2

Inventor:
MAX ADOLF MÜLLER
By E. J. Brown
ATTORNEY.

United States Patent Office 2,765,163
Patented Oct. 2, 1956

2,765,163

RESILIENT DEVICE

Max Adolf Müller, Burscheid, near Koln, Germany, assignor, by mesne assignments, to Rand-Goetze Corporation, Cleveland, Ohio, a corporation of Ohio Application June 5, 1951, Serial No. 229,885

Claims priority, application Germany June 7, 1950

6 Claims. (Cl. 267—1)

This invention relates to resilient or spring structures, especially useful in vehicles and vibratory machines such as vibrating screens, where oscillation of the structures, in spite of load changes, should not exceed certain limits.

More specifically, this invention relates to spring suspension systems having non-linear elastic constants produced by a novel combination of tension and compression springs. The desired constants may be obtained independently of the type of resilient materials used in the system.

According to this invention, there are provided suspension devices having a load-carrying axis area and a supporting area which is laterally spaced from the load-carrying axis. One or more resilient means connect this axis area with the load area. These resilient means include a first portion connecting one part of the load-carrying area with the supporting area and a second portion connecting an opposite remote part of the load-carrying area with the supporting area. The first portion is subjected to tension stresses when the load-carrying area is deflected along its axis relative to the supporting area while the second portion is compressively loaded. As the axial deflection of the load-carrying area increases the tension of the first portion increases and the compression of the second portion increases until the deflection reaches a point where the part of the axis area under compression is aligned with a transverse plane passing through the supported area. Continued deflection of the loaded area relieves the compression of the second portion and eventually this second portion undergoes a reversal of stress to assume a condition of tension adding to the tension of the first portion in resisting deflection.

In the preferred suspension devices of the invention the parts of the load-carrying axis connected with the stressed portions of the resilient means lie on opposite sides of the supporting area and converge toward said area to provide opposed conical shapes. The angle between the loading axis and the tension stressed converging or conical portion is less than the angle between the loading axis and the compression stressed converging or opposed conical portion. This difference in angular relationship increases until the compression loaded portion passes through the transverse plane including the supporting area.

The suspension devices of this invention when loaded in the direction of their loading axis will have a relatively "soft" deflection resistance which increases in a non-linear manner until deflection reaches the transverse plane through the supported area whereupon the resistance will slightly decrease and will then increase as the formerly compression loaded portion assumes a tension loaded condition.

It is then an object of the present invention to provide new and improved resilient spring structures capable of maintaining oscillations within desired limits regardless of load changes.

A further object of this invention is to provide a resilient structure having non-linear resistance characteristics for initial and subsequent loads.

Another object of the invention is to provide resilient suspension systems with a plurality of resilient portions which are differently stressed when the system is loaded so that some portions are under tension while others are under compression.

Another object of the invention is to provide a spring suspension system having differently stressed portions, at least one of which undergoes a reversal of stress as the load increases.

A further and specific object of the invention is the provision of a spring system having portions under tension and other portions under compression when initially loaded wherein the compression loaded portions pass through a no-load condition into a tension stress condition as the load is increased.

These and other further objects, features and advantages, with respect to the structural and spring-resistance characteristics of such devices will be apparent from the following description of exemplary preferred embodiments thereof taken in conjunction with the accompanying drawings, in which:

Figure 1 is a diagrammatical view of a resilient system according to the present invention in an exemplary embodiment;

Figure 2 is a diagrammatical view of a resilient system according to an alternative embodiment;

Figure 3 is a diagrammatical sectional view of a resilient system embodying other spring features;

Figure 4:
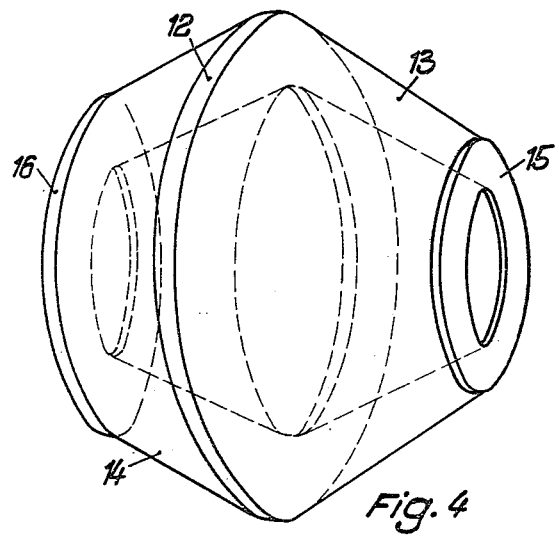
Figure 4 is a somewhat diagrammatical perspective view of a resilient spring system according to another embodiment of the present invention.

As shown in Figure 1, the resilient system includes a body member 1a resiliently supported from an associated supporting member such as a machine frame diagrammatically indicated by reference numeral 4. A pair of spring members 1 and 2 are supportingly connected to the frame 4 as at the point of connection 3; and the other ends of the springs 1 and 2, respectively, are supportingly connected to the body member 1a at spaced points 5 and 6 thereon. As shown the points 5 and 6 are located on an axis parallel to the direction of load "P" of the body member 1a.

The line A—B indicates a plane through the supporting point 3 and perpendicular to the direction of the applied load P. It thus indicates the dead-center position of point 5 as the body member is moved relatively upward by the load. It will be observed that the points 5 and 6 of the body member 1a, when their springs 1 and 2 are in normal or unloaded condition, lie on opposite sides of the line A—B.

In operation of the resilient system shown in Figure 1, as the load P is applied in an upward direction to move the body member 1a, spring member 1 is stressed in compression and spring member 2 is stressed in tension. Since point 5 is fairly close to the dead-center line A—B, its movement relatively toward the connection 3 is fairly slight, and consequently the resistance offered by the compression of spring 1 is relatively slight. Thus since the resistance is attributable largely just to the tension spring 2, the overall initial resistance is fairly "soft." This condition obtains during the initial stages of movement of the body member 1a.

Continued application of load to cause the point 5 to cross the line A—B, is resisted almost wholly by tension spring 2. Subsequent movement upwardly of the point 5 upwardly of line A—B does not initially impose greater compressive stress on spring 1, but rather, permits spring 1 to expand to relieve its compression. After the body member 1a has moved past the point where the compression of spring 1 is fully relieved, further loading to move the body member 1a still further upwardly imposes a tensile stress on the spring 1.

In contrast to the reversal of stress as just described which is undergone by spring 1, the stress in spring member 2 in response to an upwardly directed load P is always tensile.

It will be apparent that with the resilient system just described, since the deflection of spring 2 provides a substantially constantly increasing resisting force, and since the deflection of spring 1 provides a resisting force which increases at a decreasing rate until the point 5 crosses the line A—B, and then is negative until the point 5 has moved upwardly a distance sufficient for the spring member 1 to expand to its normal condition whereupon the resistance of spring member 1 again becomes positive (although due to a tensile stress rather than a compressive stress), the overall resistance offered by the spring system per unit of deflection will be variable for successive units of deflection and stages thereof. From the initial position shown, the overall resistance per unit of travel or deflection of the body member 1a will thus be initially relatively light until the point 5 has moved past the line A—B, and upwardly from the line A—B to the intermediate point at which the spring member 1 has been restored to its normal condition, and then be relatively strong as the stress produced in the initially compressed spring 1 is of tension and additive to the tensile stress of spring 2.

As shown in Figure 2, the somewhat more elaborate resilient system includes additional compression and tension springs 1'—2', respectively. As shown, these additional springs are disposed in a parallel relationship to springs 1 and 2 as of the embodiment of Figure 1. The springs 1'—2' are shown as connected to a supporting point 3' on a frame member 4'.

It will be apparent that in the operation of the resilient system shown in Figure 2, the same general effects of "soft" and "hard" resistance characteristics will be obtained as where noted with respect to the system of Figure 1.

The material for the springs 1, 2, 1', and 2' shown in Figures 1 and 2 may be steel or rubber, appropriately selected to provide the desired spring characteristics.

Figure 3 shows an embodiment of my invention in which an outer sleeve 7 resiliently supports an inner sleeve 8 by an annular conical rubber body 9 which supportingly interconnects the two sleeves. The rubber body 9 is shown as fixed to the sleeves by vulcanization.

A vertical load on the inner sleeve 8 is indicated by the reference letter P. Such a load subjects the upper portion including the upper face 10 of the rubber body 9 to compression, or pressure; and subjects the opposite portion including the lower face 11 to a pulling action, or tensile stress. The angle alpha between the face 11 and the direction of applied load, or sleeve 8, is smaller than the angle beta between face 10 and the direction of applied load, or sleeve, although both angles are acute angles.

The line A—B again denotes a reference plane drawn between the pressure and the tension means, perpendicular to the direction of application of the load or force P, at the intersection of the opposite cone surfaces. It will be apparent that the portions of the rubber body 9 below the reference plane serve as resilient members in tension similar to the springs 2—2' of Figures 1 and 2; and that the portions of the rubber body 9 above the reference plane serve as resilient members under initial compression similar to the springs 1—1' of those figures. It will be likewise apparent that like springs 1—1', the upper portions of the rubber body undergo an initial compression, with the beta-angle increasing towards 90°. During this stage the resistance is positive as the upper body portion is further compressed. Then, after the beta-angle becomes 90°, the compressed upper body portion is permitted to expand, and the resistance is negative for an amount of travel past the reference plane A—B. Subsequent load then imposes tensile stress which is additive to the tensile stress of the lower portions of the body 9.

In the embodiment of the invention illustrated in Figure 4, a supporting member such as a center ring 12 is shown as resiliently supported by a pair of rubber bodies 13 and 14 shown as of a generally conical shape. The supporting bodies 13 and 14 carry and are supported by annular disks 15 and 16, respectively.

Figure 5:
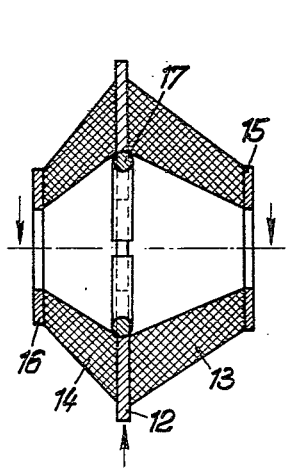
Figure 5 is a diagrammatical cross-sectional view of a resilient system according to a further embodiment of my invention.

If the center ring 12 is sub-divided into segmental portions as shown in Figure 5, a pre-tension may be applied to the device by an expansion ring 17.

Figure 6:
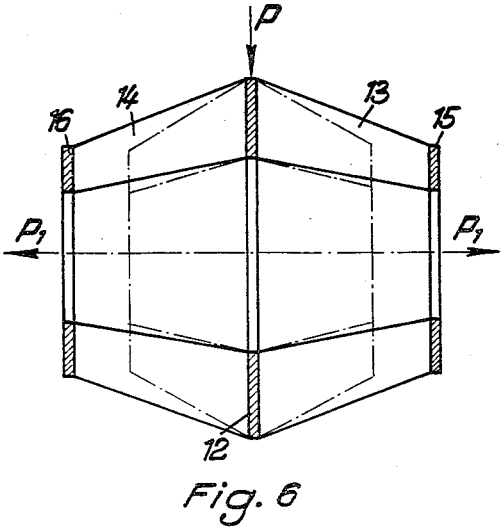
Figure 6 is a somewhat diagrammatical sectional view of a resilient system according to still another embodiment of my invention.

If the center ring 12 of Figures 4 to 6 is moved closer to the disk 16 and if the disk 16 is loaded more than the disk 15, it is possible to balance the device to have characteristics similar to the more symmetrical system of Figure 3.

The resilient systems of this invention, if loaded or stressed in a direction perpendicular to the axis of symmetry, will operate by supporting stationary loads and by absorbing small shocks or bumps with a relatively "soft" resistance and then increase in resistance to absorb the heavier shocks or bumps with a more rigid resistance. As the load increases on the resilient system of this invention, the resilience of the system will be changed to produce a "harder" spring effect.

In the embodiment of Figure 6, the resilient device is very similar to that shown in Figures 4 and 5 but the rubber bodies 13 and 14 are vertically pre-stressed or pre-tensioned by forces P1 at right angles to the stress direction.

The resilient spring members of the spring organization system, here shown as steel and rubber springs, may be used independently as shown or in a composite or combined arrangement according to the user's desire. In the drawings, the tension and compression elements shown are formed annularly, with the axes of the tension members and the axes of the compression members disposed conically. If desired, the resilient device may have the general shape of a double frusto-cone, the tension members being located on the conical face of one frusto-cone and the compression members on the other frusto-cone, with the load acting in the direction of the axis of the double frusto-cone. Or, the resilient system may be constructed of a general double frusto-cone configuration such that the tension and compression members are located in the surface of each cone, with the load acting perpendicularly relative to the axis of the frusto-cone.

The base of the two frusto-cones is preferably surrounded by a closed ring, as a metal ring.

If desired, the spring members may be pre-tensioned in accordance with the desired loads and operating characteristics. Also, the initial mounting angles of the unloaded springs may be varied, or springs of differential resistance characteristics may be employed, to give desired overall spring and resistance characteristics.

It will thus be seen from the foregoing description of my invention according to exemplary preferred embodiments, considered in conjunction with the accompanying drawings, that the present invention provides a new and improved resilient structure or organization having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A spring suspension system including a load carrying axis means having first and second portions in axially spaced relation, a supporting means in laterally spaced relation from the axis means, resilient means between the axis means and supporting means for transmitting loads therebetween, said resilient means having oppositely inclined linear faces extending from the axis means to the supporting means, a first portion of said resilient means lying adjacent one of said faces, a second portion of said resilient means lying adjacent the other of said faces, said first portion of the resilient means connecting the first portion of the axis means with the supporting means, said second portion of the resilient means connecting the second portion of the axis means with the supporting means, said axis means being shiftable along its axis relative to the supporting means, said second portion of the resilient means being shiftable with the axis means to move through a transverse plane including the support means and then having the adjacent face inclined in the same direction as the face adjacent the first portion of the resilient means, said first portion of the resilient means being stressed in tension to resist said shifting and increasing in tension as said shifting increases in the same direction, said second portion of the resilient means being stressed in compression to resist said shifting, and increasing in compression stress as the shifting increases in the same direction only until the second portion of the axis means connected with the second portion of the resilient means lies in a transverse plane including the supporting means and thereupon being progressively relieved of compression stress as said second portion of the axis means passes beyond said plane and thereafter being stressed in tension.

2. The spring suspension system of claim 1 in which the angle between the axis means and the inclined linear face adjacent the first portion of the resilient means is less than the angle between the axis means and the inclined face adjacent the second portion of the resilient means and the difference in said angles increases as the second portion of the resilient means is shifted toward a transverse plane including the support means and increases in compression stress.

3. A resilient suspension system which comprises spaced concentric support and supported members, resilient means between said members for transmitting loads therebetween, said resilient means having oppositely conically inclined linear faces extending from the support member to the supported member, a first portion of said resilient means lying adjacent one of said faces, a second portion of said resilient means lying adjacent the other of said faces, said support and supported members being shiftable to move said second portion of the resilient means in a direction to flatten out the conically inclined face thereof and then incline the face in the opposite direction while simultaneously increasing the degree of conical incline of the face of said first portion, said support and supported members coacting to confine the resilient means to compression load the second portion as the face thereof is deflected toward a flattened position while accommodating simultaneous tension loading of the first portion, and said second portion being subjected to tension stress as the face thereof becomes inclined in the same direction as the face of the tension loaded first portion.

4. A resilient suspension device comprising a first rigid ring, a pair of opposed hollow frusto conical resilient sleeves extending laterally from said ring in opposite directions and having the large inner ends thereof secured to said ring, a pair of second rigid rings on opposite sides of the first ring, second ring being secured to the small end of the adjacent frusto conical sleeve, said first ring being shiftable relative to said second rings to flatten first portions of the sleeves into generally cylindrical shapes and then into shapes inclined in the same direction as diametrically opposite second portions of the sleeves while simultaneously moving said diametrically opposite second portions into more acute conical shapes, said first portions of the sleeves increasing in compression stress as they are deformed into cylindrical shapes and then decreasing in compression stress as they are inclined in the same direction as the diametrically opposite second portions of the sleeves, and said diametrically opposite second portions of the sleeves increasing in tension stress as they are deformed into more acute conical shapes.

5. The suspension device of claim 4 wherein the first ring and the pair of second rings initially have a common axis and the first ring is loaded in a direction perpendicular to said axis.

6. The suspension device of claim 4 wherein the first ring is positioned closer to one of the second rings and the resilient sleeve therebetween is shorter than the sleeve on the opposite side of the first ring.

References Cited in the file of this patent

UNITED STATES PATENTS

| | | |
|---|---|---|
| 709,396 | Corssen | Sept. 16, 1902 |
| 1,466,817 | Dixon | Sept. 4, 1923 |
| 1,887,579 | Carozzi | Nov. 15, 1932 |
| 2,019,052 | Lord | Oct. 29, 1935 |
| 2,415,280 | Fink | Feb. 4, 1947 |
| 2,588,171 | Smith et al. | Mar. 4, 1952 |
| 2,600,090 | Barber et al. | June 10, 1952 |

FOREIGN PATENTS

| | | |
|---|---|---|
| 290,074 | Germany | July 1, 1919 |
| 389,181 | Italy | May 21, 1941 |
| 894,629 | France | Mar. 20, 1944 |